United States Patent [19]
Lindauer et al.

[11] Patent Number: 5,617,983
[45] Date of Patent: Apr. 8, 1997

[54] IN-LINE SKATE CARRIER

[76] Inventors: John G. Lindauer, 9215 S. Bellflower Way, Highlands Ranch, Colo. 80126; Steven F. Lindauer, 303 16th St., Suite 16, Denver, Colo. 80202

[21] Appl. No.: 420,865

[22] Filed: Apr. 12, 1995

[51] Int. Cl.$^6$ .................................................. B62J 7/00
[52] U.S. Cl. ................. 224/433; 224/431; 224/460; 224/454; 224/455; 206/315.1; 211/34; 294/145
[58] Field of Search ............................. 224/30 R, 32 R, 224/32 A, 39, 417, 428, 431, 433, 441, 442, 451, 456, 459, 460, 461; 294/145, 146, 149, 158, 160, 162, 165, 166; 206/315.1; 211/34, 37

[56] References Cited

U.S. PATENT DOCUMENTS

| | | |
|---|---|---|
| D. 336,877 | 6/1993 | Fenton . |
| D. 342,473 | 12/1993 | Konecny et al. . |
| 1,198,406 | 9/1916 | Beaumont ............................ 211/34 |
| 2,539,381 | 1/1951 | Bachmann ......................... 224/32 R |
| 4,126,256 | 11/1978 | McGruder ............................ 224/205 |
| 4,154,382 | 5/1979 | Blackburn . |
| 4,163,513 | 8/1979 | Kramer .............................. 224/32 R |
| 4,269,337 | 5/1981 | Sobotka . |
| 4,326,746 | 4/1982 | Grihalva . |
| 4,328,914 | 5/1982 | Michaud . |
| 4,331,357 | 5/1982 | Contreras . |
| 4,383,625 | 5/1983 | Kiang . |
| 4,429,818 | 2/1984 | Patterson . |
| 4,477,004 | 10/1984 | Barro . |
| 4,487,344 | 12/1984 | Blackbourn . |
| 4,596,346 | 6/1986 | Lepage . |
| 4,666,071 | 5/1987 | Irwin et al. . |
| 4,671,438 | 6/1987 | LaPlante . |
| 4,760,943 | 8/1988 | Bass et al. . |
| 4,762,255 | 8/1988 | Dunn . |
| 4,840,298 | 6/1989 | Belka . |
| 5,014,830 | 5/1991 | Seynhaeve ............................ 190/36 |
| 5,040,710 | 8/1991 | Lee .......................................... 224/39 |
| 5,167,170 | 12/1992 | Croteau ................................ 294/146 |
| 5,217,149 | 6/1993 | Simonett . |
| 5,222,639 | 6/1993 | Simonett . |
| 5,251,796 | 10/1993 | Shelhart . |
| 5,257,727 | 11/1993 | Chen . |
| 5,269,580 | 12/1993 | Hsiao . |
| 5,271,540 | 12/1993 | Katz et al. ............................ 224/32 R |
| 5,303,955 | 4/1994 | Zurnamer . |
| 5,341,971 | 8/1994 | Newbold et al. ........................ 224/39 |
| 5,421,495 | 6/1995 | Bubik et al. .......................... 224/924 |
| 5,497,927 | 3/1996 | Peterson ................................ 224/537 |

FOREIGN PATENT DOCUMENTS

| | | | |
|---|---|---|---|
| 633110 | 12/1961 | Canada .............................. 224/32 R |
| 432185 | 3/1948 | Italy ........................................ 224/37 |
| 76579 | 12/1954 | Netherlands .......................... 224/37 |
| 280404 | 12/1964 | Netherlands .......................... 211/37 |

*Primary Examiner*—Henry J. Recla
*Assistant Examiner*—Gregory M. Vidovich
*Attorney, Agent, or Firm*—Charles C. Corbin

[57] ABSTRACT

A rack for carrying in-line type roller skates over the rear wheel of a bicycle. The rack carries the skates in a saddle bag fashion, with each one of a pair of skates being held within an enclosure that is adjacent to each side of a bicycle's rear wheel. The enclosure holds the skate along the skate's lengthwise axis parallel to the direction of travel of the bicycle.

5 Claims, 18 Drawing Sheets

IN-LINE SKATE CARRIER

FIELD OF THE INVENTION

The present invention relates generally to cargo carriers adapted to be mounted on bicycles, and in particular relates to such carriers adapted specifically for carrying skates on a bicycle and particularly in-line skates.

BACKGROUND OF THE INVENTION

Ice skating has long been a popular winter season pastime and sport, in all of its forms, including figure skating, speed skating and ice hockey. The familiar ice skates gradually evolved into roller skates, which then enabled the user to skate (more correctly, enabled the user to roll ) without ice. Roller skates are now generally characterized by having construction that includes an ankle-height boot of resilient polymeric material having some interior padding, with the boot being fixably mounted upon a chassis that has front and rear axles each bearing a pair of wheels of relatively soft resilient elastomer.

Roller skates in turn evolved into in-line skates. In-line skates, like roller skates, are generally characterized by an ankle-height boot of resilient polymeric material having interior padding, with the boot being fixably mounted upon a chassis. However, an in-line skate chassis has two, three or, most commonly, four axle-mounted wheels. The wheels are mounted in a line with respect to one another, so that the weight of the user is distributed in-line in much the stone fashion as on an ice-skate. Overall, an in-line skate can have dimensions similar to those of a skiing boot of the same user's foot size. Thus, it can be seen that in-line skates are relatively bulky items of sporting equipment.

A branch of in-line skating is the rapidly growing sport of in-line hockey. In-line hockey can be viewed as another variant of the sport of ice hockey, along with street hockey or gymnasium hockey. Street hockey and gymnasium hockey, which are played by players wearing sneakers, form a natural point from which a player can make the transition into in-line hockey, in which the player wears in-line skates. In order to get to practice sites or game sites, the players, many of whom will be youngsters, would greatly benefit from a way of being able to more efficiently haul their in-line skates around. The various paraphernalia involved, such as gloves, helmets, pads, and so forth will generally take up most of the space in a backpack or rucksack. Thus, an alternate way of carrying the player's in-line skates by bicycle to the site of play would be desireable. The prior art discloses no method of specifically carrying boots in a secure fashion on a bicycle, much less skates or in-line skates.

Rear carriers have long been known to be useful accessories for bicycles, freeing up the rider's hands for safe and efficient operation of the handlebars and the brake and speed change levers, while carrying a load in a convenient location behind the seat. Such carriers have been known to be useful for the transport of books, clothes, briefcases, food and tools. Virtually every type of non-basket rear carrier that has ever been designed has included the structural element of having a horizontal load-bearing platform or wire framework, making this a nearly universal feature of bicycle rear carriers.

It is an object of the present invention to provide a device for safely and effectively carrying in-line skates on a bicycle, to be used in combination with any type of bicycle rear carrier that can provide a horizontal load bearing rack or frame. It is another object of the present invention to provide bicycle carriers that are used with certain of the embodiments of the invention that can be not only of the type having a horizontal carrying rack, but also having vertical or sloped carrying racks. Although it is preferred that in-line skates be carried in an upright position, the modules can be so configured as to carry the skates in a vertical position, (toe pointed upward) a sloped position, or even up-side down, which of course would prevent moisture from getting into the inside of the skate's boot. Likewise, although it is preferred that the skates be carried in a plane parallel to the plane of the bicycle's wheels, they could be carried in a plane perpendicular or at a slope to the plane of the wheels. It is an another object of the present invention to provide a device for safely and effectively carrying in-line skates on a bicycle and simultaneously protecting the in-line skates from dust, dirt, water and so forth. Another object of the present invention is to provide for a means of carrying in-line skates that can be readily mounted and de-mounted on and off a bicycle rear carrier. It is yet another object of the present invention to provide for a combination of an in-line skate carrying device along with a rear carrier, wherein the in-line skate carrying means can be de-mounted from the rear carrier to permit other uses of the rear carrier. Another object of the invention is to provide for a means of carrying in-line skates in a fashion that properly balances the load so as to permit the safest operation of the bicycle. There is also as an object of the invention the goal of being able to transport other types of footwear in addition to that of in-line skates, including, but not limited to, roller skates, hiking boots, gym shoes, other types of athletic and sports footwear, dress shoes and other casual shoes. An alternative embodiment of the invention has the additional object of being capable of being mounted over the rear or front wheel of a bicycle, and not relying on a bicycle rack, but rather having all necessary hardware for being directly mounted on the bicycle frame. Another object of the invention is to provide for an apparatus that permits a user to carry in-line skates by hand by means of a convenient single carrier that can be disengaged from a bicycle carrying rack. An alternate embodiment of the invention is suitable for carrying any kind of sport, dress or working footwear in the saddlebag-like enclosures. The holder is simply molded along a somewhat different contour, eliminating the need for inwardly concave surfaces to grip the sidelong outline of an in-line skate. By varying the molding of the sidewall contour accordingly, conventional roller skates can be carried, as well as ski boots, hiking boots, ice skates, riding boots, shoes and the like.

The present invention accomplishes these objects by featuring a molded pannier-like module that can be mounted upon a horizontal load-bearing rack or frame of a bicycle's rear carrier, stradling the rack so that two opposed skate carriers rest astride each side of a bicycle's rear wheel. The module can alternatively be mounted over a bicycle's front wheel. In-line skates conveniently fit into each side carrier, which each additionally features a central longitudinal channel running parallel to the longitudinal axis of the carrier, into which the wheel array of the in-line skate rests. Another feature of the invention is the ability of each side carrier to resiliently clamp onto the sides of the skate being carried, in order to hold the skate securely in the side carrier during transport. Another feature of the invention is the ability to conveniently mount or demount from any bicycle rear carrier that has a horizontal cargo rack or frame.

An alternate embodiment of the invention features a molded pannier-like module that is supported by struts and clamps that attach directly onto a bicycle frame. Like the embodiment that attaches onto a bicycle frame, this embodiment features a module stradling the bicycle's wheel so that two opposed skate carriers rest astride each side of a bicycle's rear wheel. In-line skates conveniently fit into each side carrier, which each additionally features a central longitudinal channel running parallel to the longitudinal axis of the carrier, into which the wheel array of the in-line skate rests.

SUMMARY OF THE INVENTION

In summary, the invention is a carrier for footwear in general, and of in-line skates in particular, (skates of the type having a series of in-line wheels, a wheel mounting frame and a boot above the wheels and secured to the frame), the carrier comprising: a carrying module adapted to carry at least one pair of footwear; said module defining a pair of opposed footwear holders, each footwear holder adapted to receive an article of footwear: each article of footwear being carried within an opposed holder, each holder being fixably or removably mounted adjacent either one of two sides of a bicycle wheel. The carriers come in three types. The first type is a carrier having at least one footwear holder that can be mounted onto a bicycle carrying rack. The second type is a carrier likewise having at last one footwear holder that mounts directly onto a bicycle frame through the use of connecting members and a lateral connecting bar, and which therefore does not need a pre-existing bicycle carrying rack. The third type is a pair of footwear holders that each mounts onto opposite sides of a bicycle carrying rack.

DESCRIPTION OF THE PREFERRED EMBODIMENTS

Figure 1:
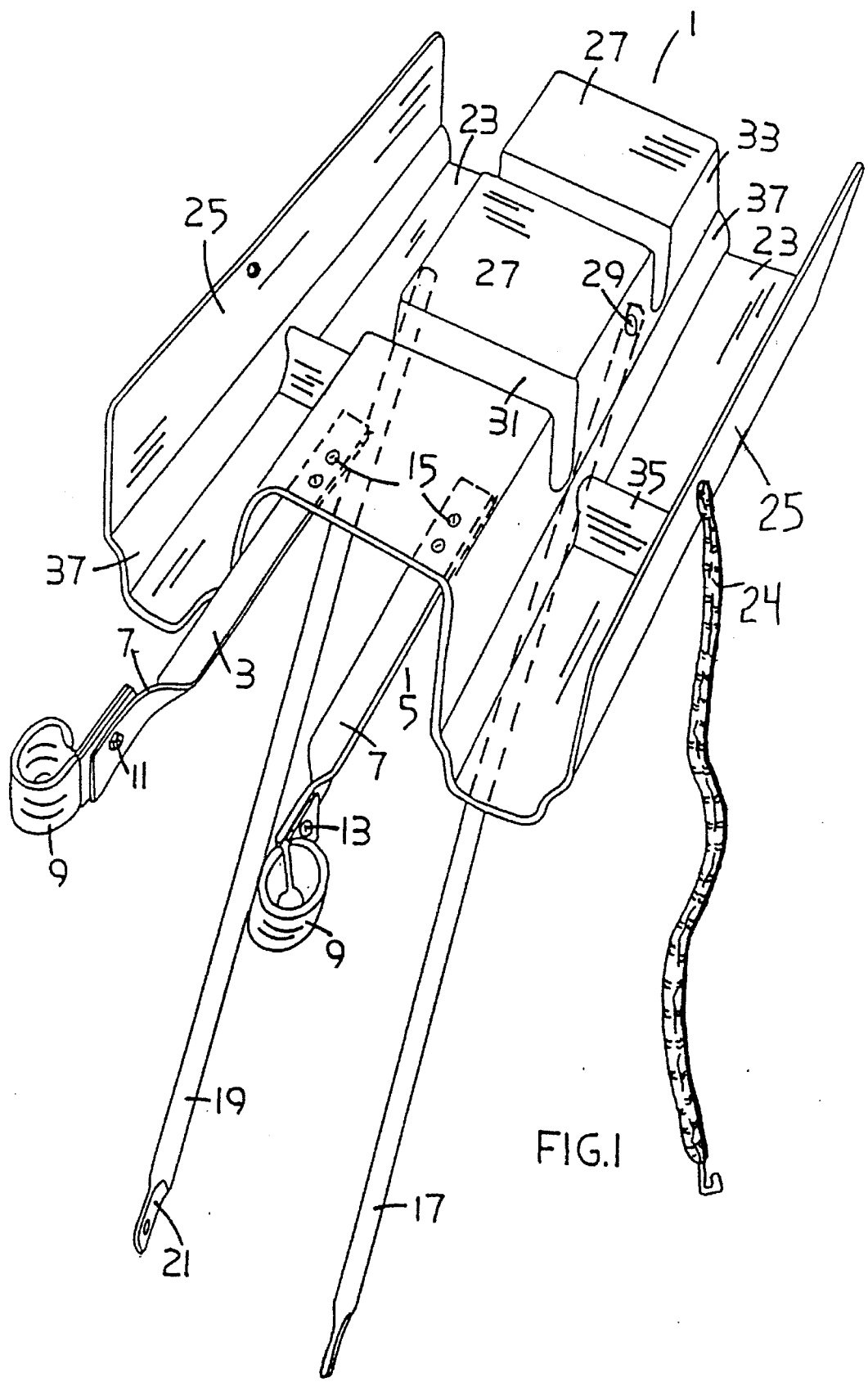
FIG. 1 is a perspective view of the embodiment of the invention, not to scale, showing the skate carrying module, support struts and horizontal support bars.

Referring first to FIG. 1, there is shown in perspective view a first preferred embodiment of the invention in which articles of footwear, in particular in-line skates, are seated within areas for receiving them in carrier module 1. Carrier module 1 is most preferably of unitary construction, either manufactured by injection molding, according to methods well known in that art, or manufactured by thermoforming a sheet of suitable polymer, again according to methods well known in that particular art. Suitable polymers include polyurethane, ABS plastic or ASA plastic, or any other suitable thermoplastic or thermosetting resin known to the art. Such polymers can furthermore be reinforced by suitable fibers such as fiberglass or Kevlar brand of aramid fiber. Furthermore, the module can be fabricated out of an extrudable metal, such as aluminum. In an alternative embodiment, nodule i can itself be comprised of multiple body panel components, such that one or more side wall panel members can be permanently affixed to one or more floor panel members, and so forth. Panel members are here defined to include panels, struts, brackets, braces, framework members, wire mesh or meshwork, channels, and bars and structural equivalents for any of the preceding. Panel members can be fastened by rivets, adhesive, screws, brackets or nut and bolt combinations. The number and type of such body panel components is entirely within the choice of the maker, so long as a module is assembled that is especially adapted and configured so as to receive an in-fine skate. These alternative ways of making the module are also applicable to the embodiment of the invention that is comprised of a separate pair of modules, described further below. It is preferred that an ultraviolet sunlight inhibitor be added to whatever polymer is chosen, since the carrier of the invention will be exposed to sunlight during most of its use. The carrier module 1 is molded, thermoformed or assembled to form several distinct structural members. A horizontal substantially planar carrier attachment surface 27 forms a base upon which the weight of the carrier of the invention and the carrier's load of skates rests. The carrier attachment surface 27 can be completely smooth, or can be so molded or formed as to include one or more reinforcement troughs 31. The troughs 31 have the effect of lending structural strength to the carrier of the invention by making it more rigid in the longitudinal, perpendicular and transverse axes. FIG. 1 illustrates two such troughs 31, but this is only a most preferred embodiment, and other numbers of troughs can be selected as well. Extending perpendicularly downward from said carrier attachment surfaces 27 are the inner side walls 33. In the most preferred embodiment, extending from the inner side walls 33 are inwardly concaved walls 37. Such inward concave curviture is useful in conforming the surfaces of the carrier nodule to the outer shape of typical in-line skates. Extending from the inwardly concaved walls 37 are the floors 23. The floors 23 are of a preselected width so as to accommodate the shoes or boot of choice, most preferably, in-line skates. The floor 23 then extends laterally so as to form another complementary inwardly concaved wall 37, which in turn extends to form outer side wall 25. It can therefore be seen that a pocket is defined by inner side wall 33, first inwardly concave wall 37, floor 23, second inwardly concave wall 37 and outer sidewall 25. When an article of footwear, and most preferably, an in-line skate, is placed within the thusly formed pocket, it is held substantially upright and in a plane parallel to the direction of travel of the bicycle. When properly molded or formed, the side walls of the carrier can be somewhat spring biased so as to exert a clamping force on the side of the skate. When optional rubber or plastic grommets or bumpers are installed into the sidewalls, these thus help to firmly seat the skate within the pocket during bumps encountered when the bicycle is being ridden. Another aid to securely seating the article of footwear in the pocket area is the inclusion of one or more hold-down straps or cords. These can take the form of straps that buckle or are held by Velcro®-style hook and loop fasteners, or cords, including bungee cords. The hold down means can be one piece or two pieces with a fastener in between the two pieces.

Figure 11:
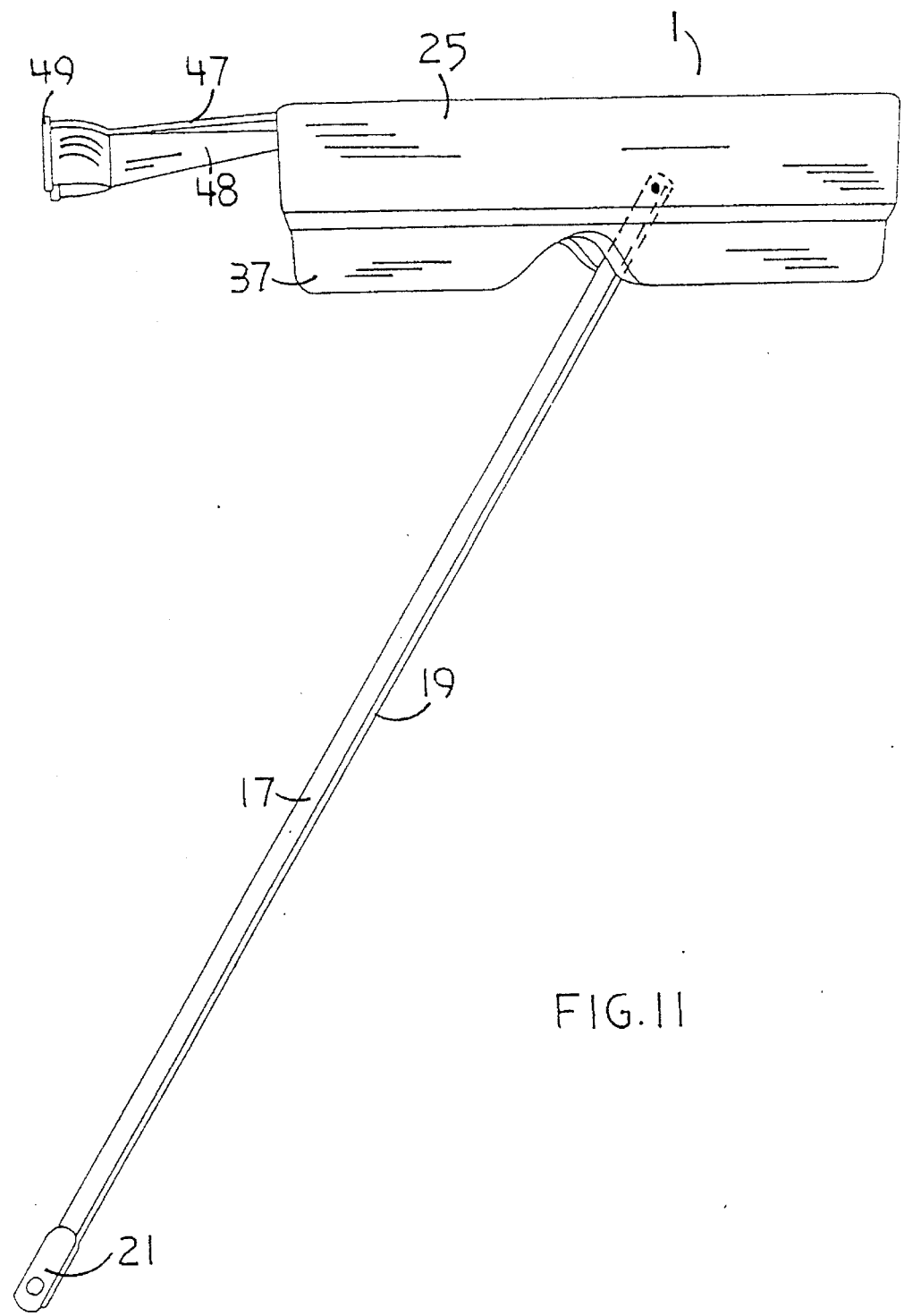
FIG. 11 is a side elevational view of the embodiment of the invention illustrated in FIGS. 3 and 7.
Figure 11A:
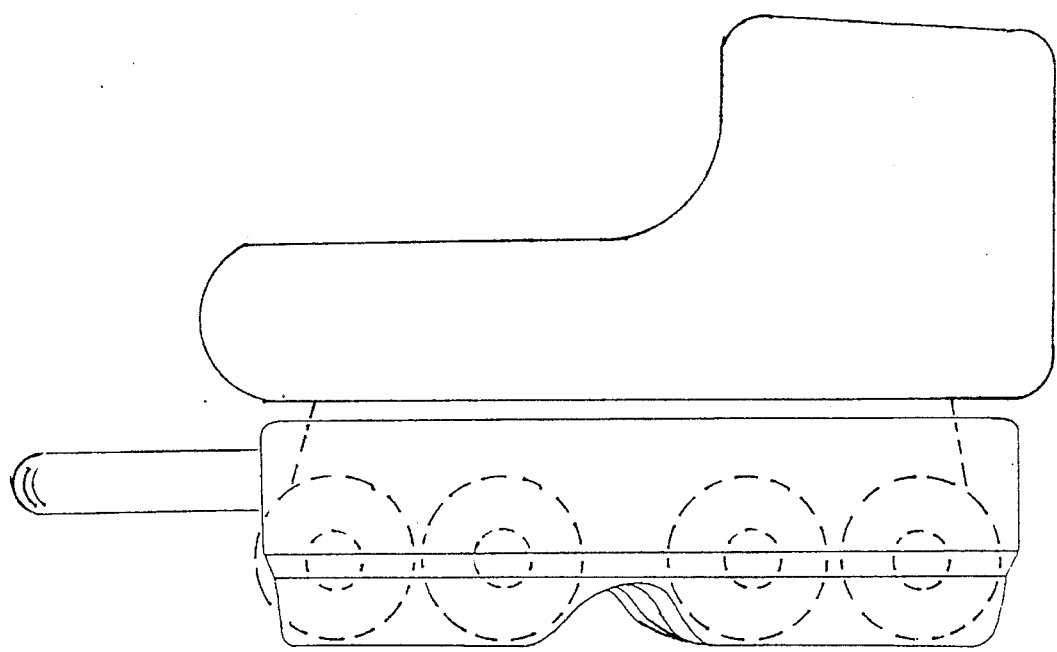
FIG. 11A is a side elevational view of the embodiment of the invention illustrated in FIGS. 4 and 8, illustrating an article of footwear, in this case an in-line skate, seated within the skate carrying module.
Figure 12:
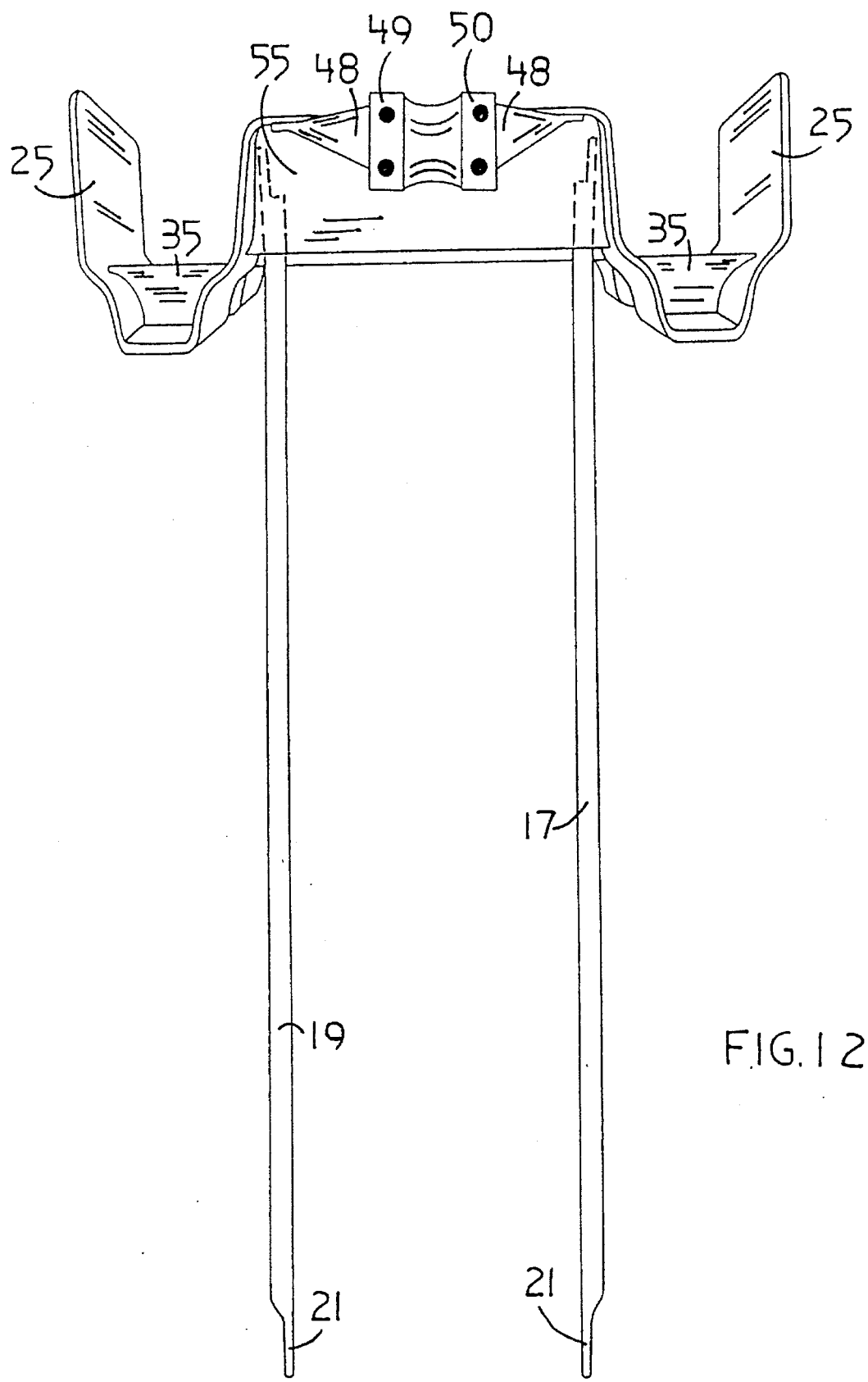
FIG. 12 is a frontal elevational view of the embodiment illustrated in FIGS., 3, 7 and 11.
Figure 13:
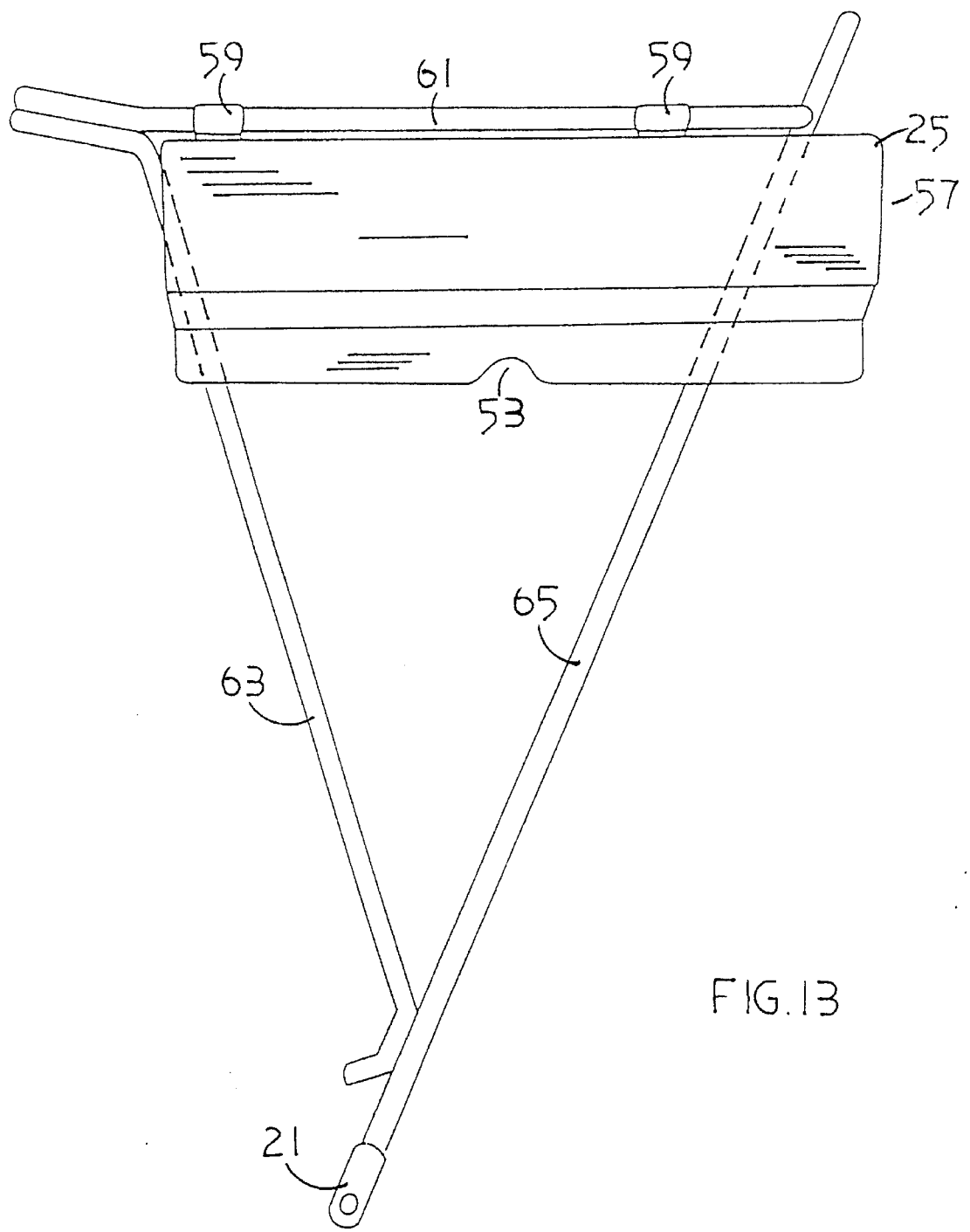
FIG. 13 is a side elevational view of the hemi-bodied embodiment of the invention, showing one of two skate carrying modules, suspended from the side bar of a typical bicycle rear carrier.
Figure 14:
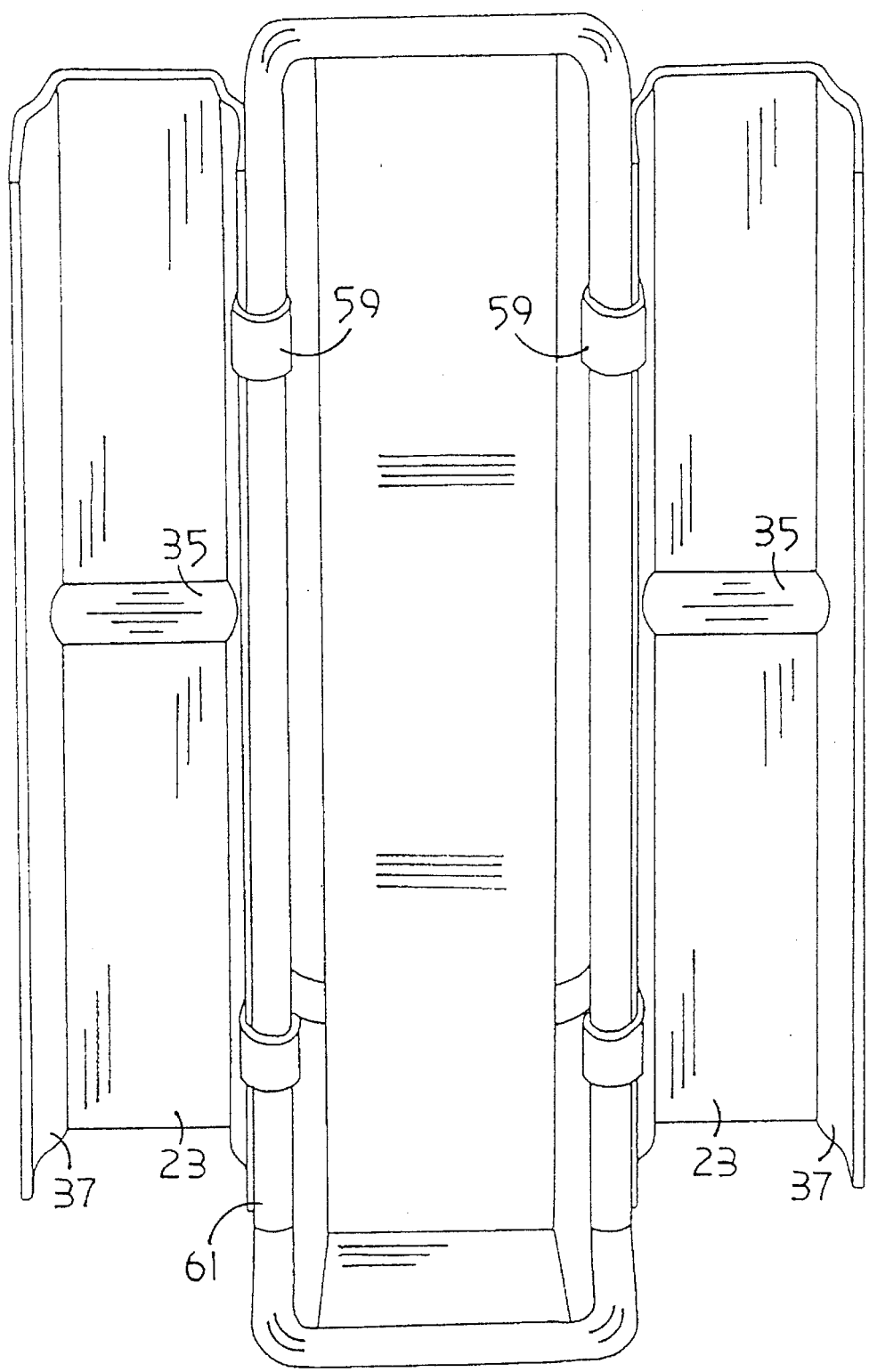
FIG. 14 is a top view of the embodiment of the invention illustrated in FIG. 13, showing two of the skate carrying modules suspended from the side bars of a typical bicycle rear carrier.
Figure 15:
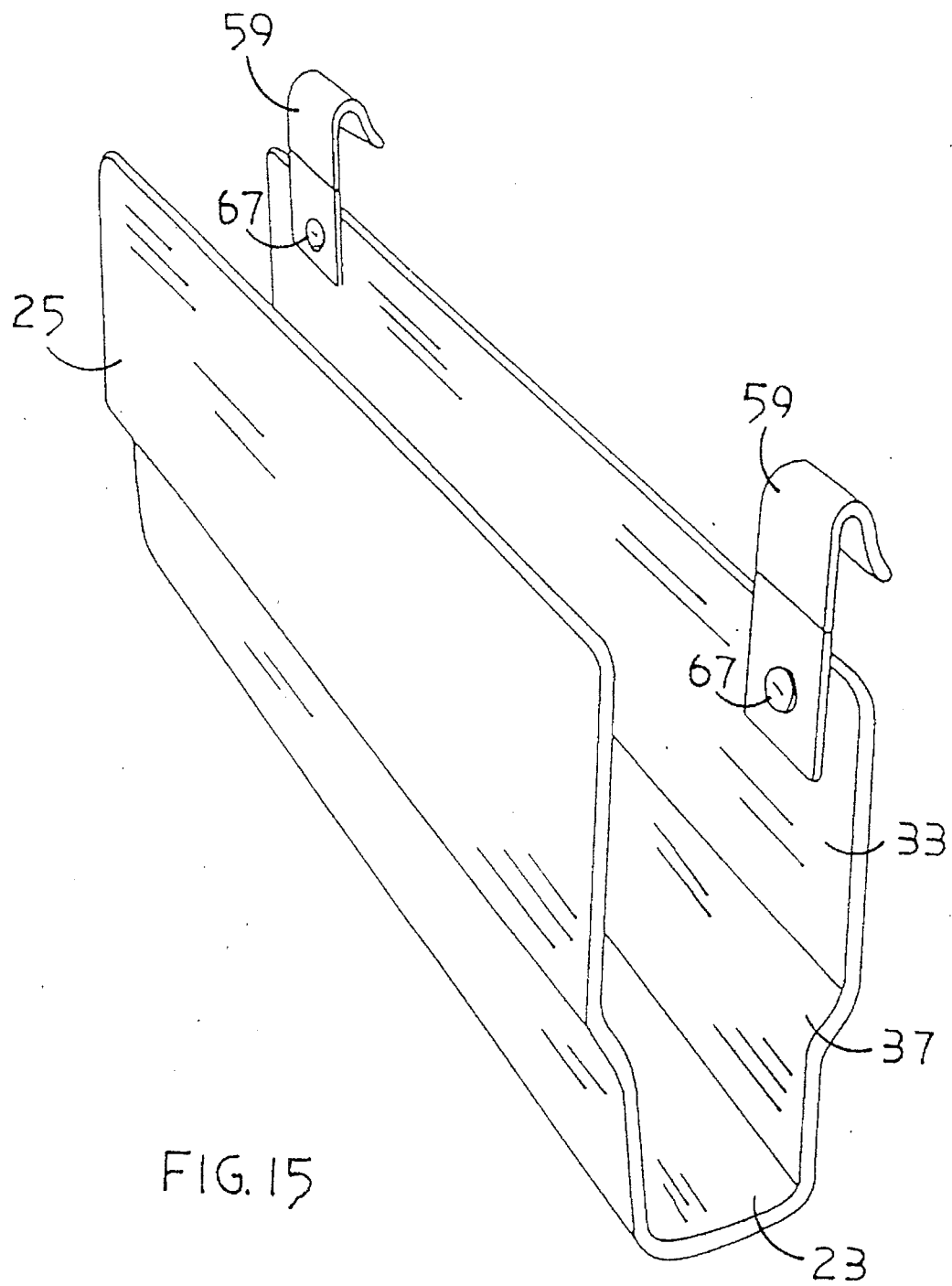
FIG. 15 is a perspective view of the skate carrying module the type illustrated in FIGS. 13 and 14.
Figure 16:
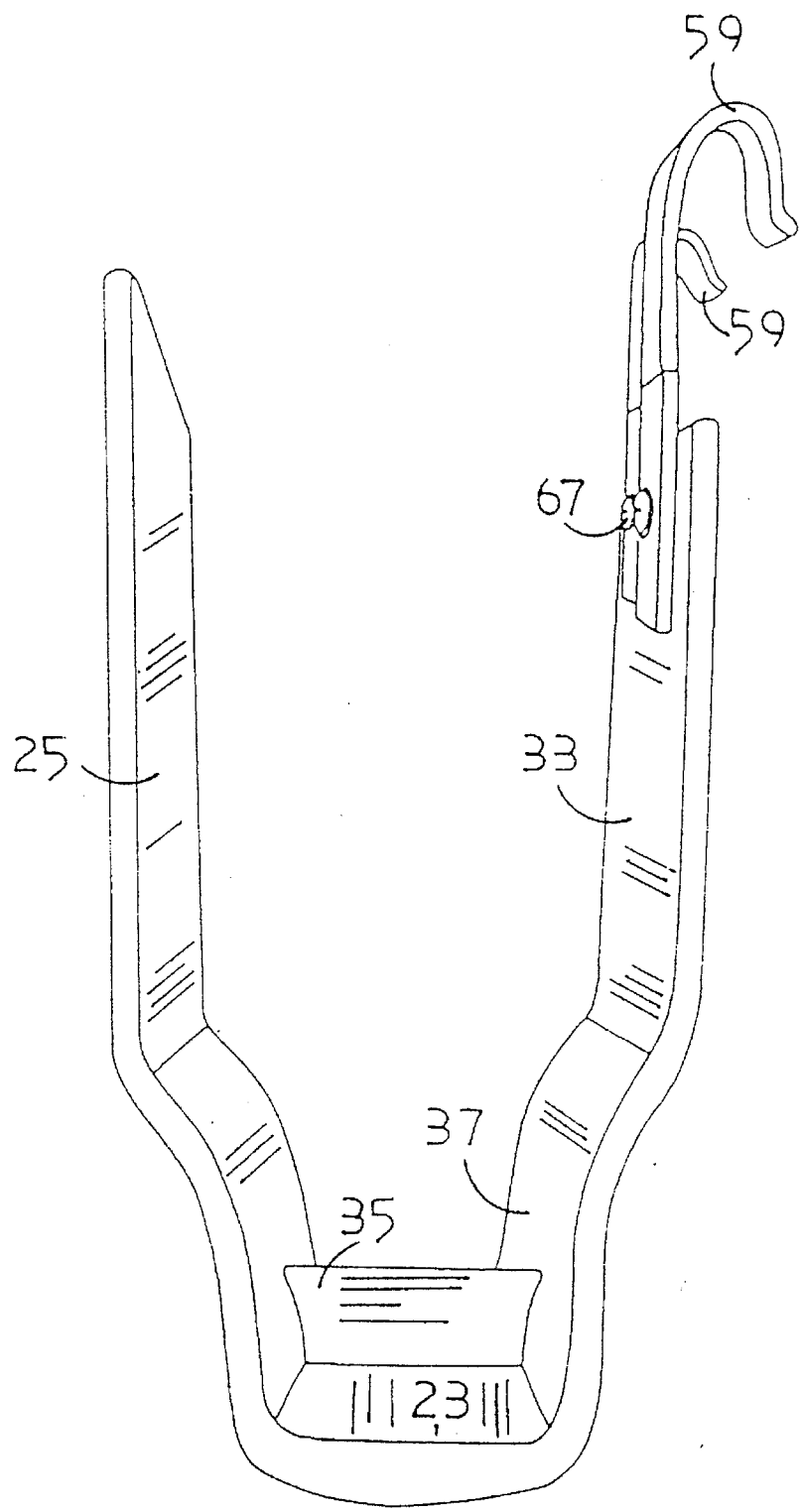
FIG. 16 is a front end view of the skate carrying module of the type illustrated in FIGS. 13, 14 and 15.
Figure 17:
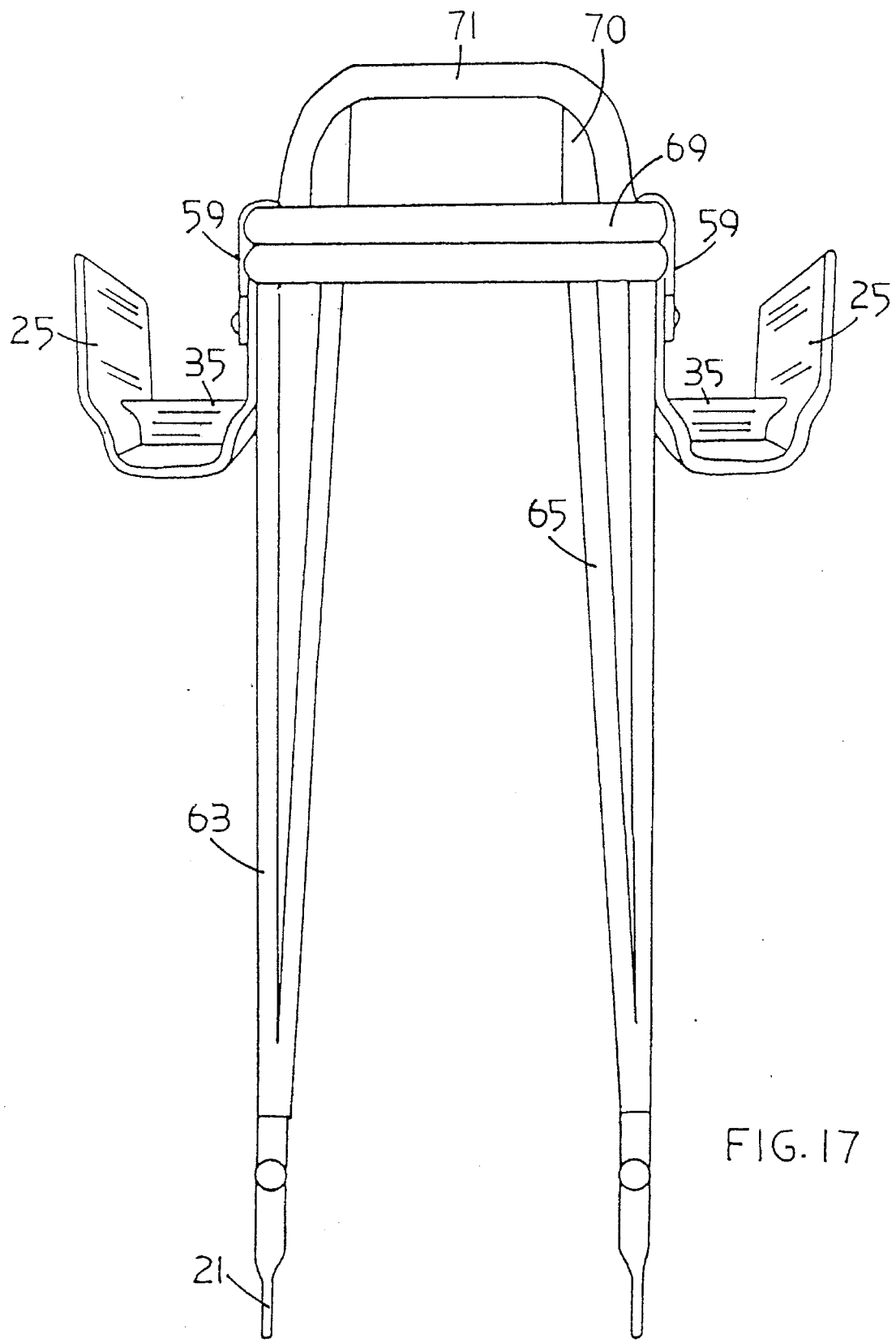
FIG. 17 is a front end view of the skate carrying module of the type illustrated in FIG. 16, with a left handed unit and a fight handed unit illustrated suspended from a typical bicycle rear rack.

In the floor 23 there is formed an anti-roll wheel chock 35. Chock 35 is illustrated in the form of a transverse ridge. This ridge helps seat an in-line skate or roller skate more securely by acting as a wheel chock to hinder forward or backward rolling of the skate. This is additionally illustrated in FIG. 11 A, which demonstrates how the chock 35 would tend to hinder the rolling of the wheels of the skate. Again, the ridge is either molded or formed, according to the manufacturing method chosen to form the module, as discussed above. The chock can be in the form of a ridge, hump, speed bump, block, dragon's tooth, or any other shape selected so as to block the rolling motion of a wheel.

Module 1 can be readily attached to the horizontal elongated load frame of a conventional rear bicycle rack. Such bicycle racks are typified by the racks disclosed in U.S. Pat. No. 4,154,382, the entire disclosure of which is incorporated herein by reference. The attachment of module 1 can be by any conventional means including C-clamps, spring biased clamps, bungee cords, clips, snaps of the type disclosed in U.S. Pat. No. 4,760,943, the entire disclosure of which is incorporated herein by reference, and the like. In addition, since in a preferred embodiment the module 1 is of molded unitary construction, it can be molded side hanging hook or clip that permits the module to hang off the side of a horizontal load frame.

Figure 2:
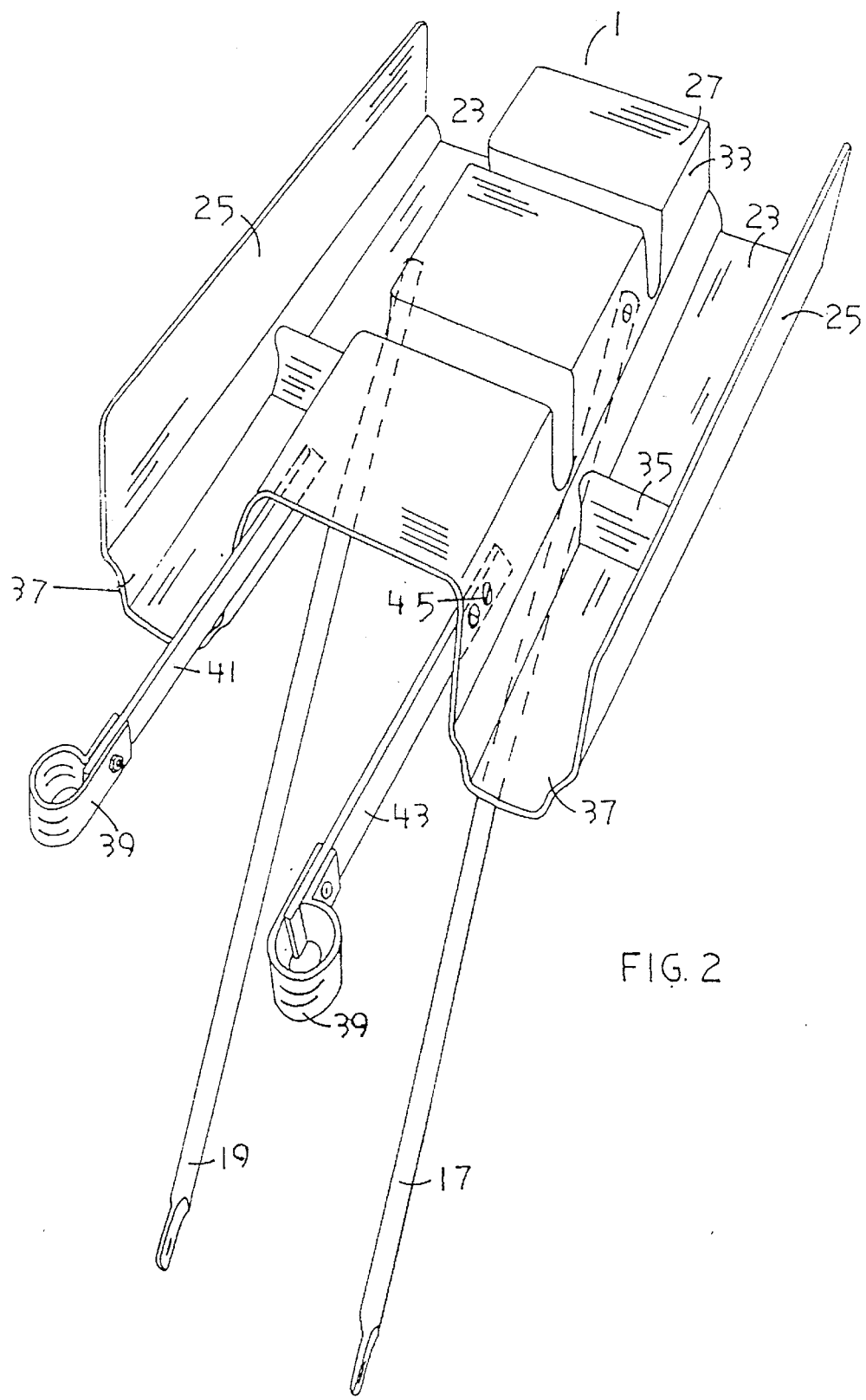
FIG. 2 is a perspective view of the embodiment of the invention, not to scale, showing an alternative embodiment of clamp arrangement to the horizontal support bars, and an alternative embodiment of fastening the horizontal support bars to the skate carrying module.
Figure 3:
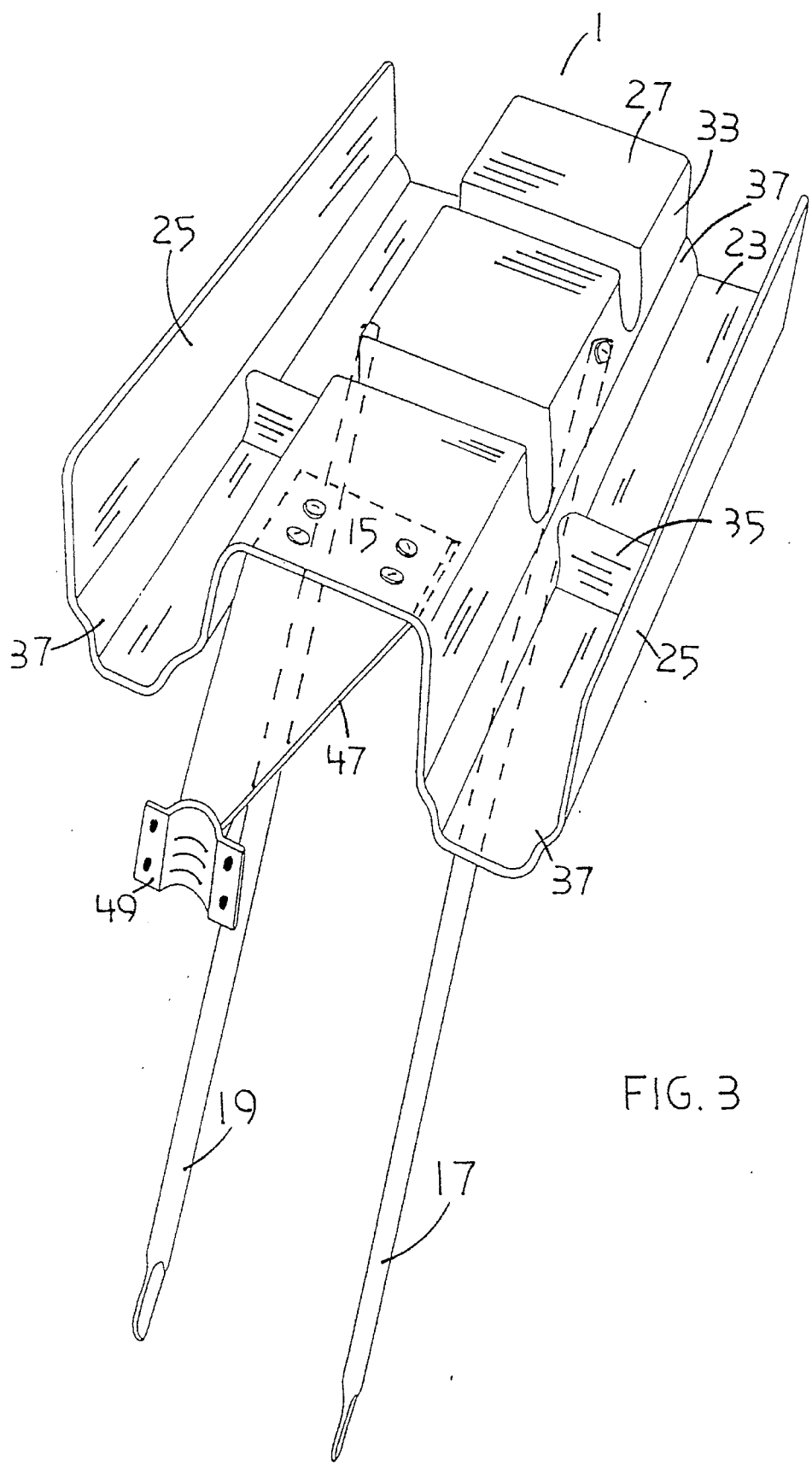
FIG. 3 is a perspective view of the embodiment of the invention, not to scale, showing an alternative embodiment of horizontally supporting the skate carrying module by means of a tongue bracket.
Figure 4:
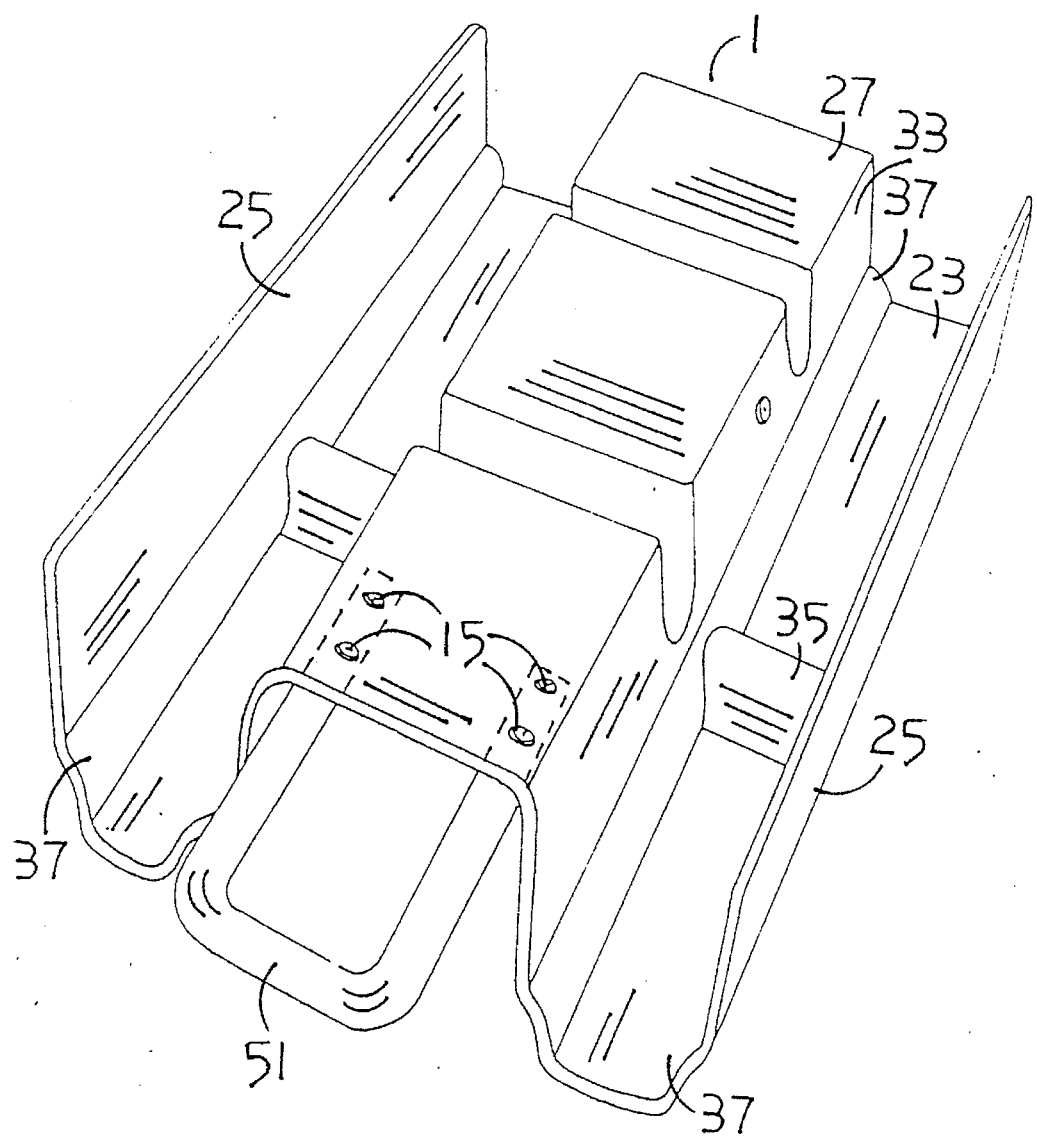
FIG. 4 is a perspective view of the embodiment of the invention, not to scale, showing an alternative embodiment of horizontally supporting the skate carrying module by means of a "U"-shaped support bar, which can also function as a hand-held carrier.
Figure 5:
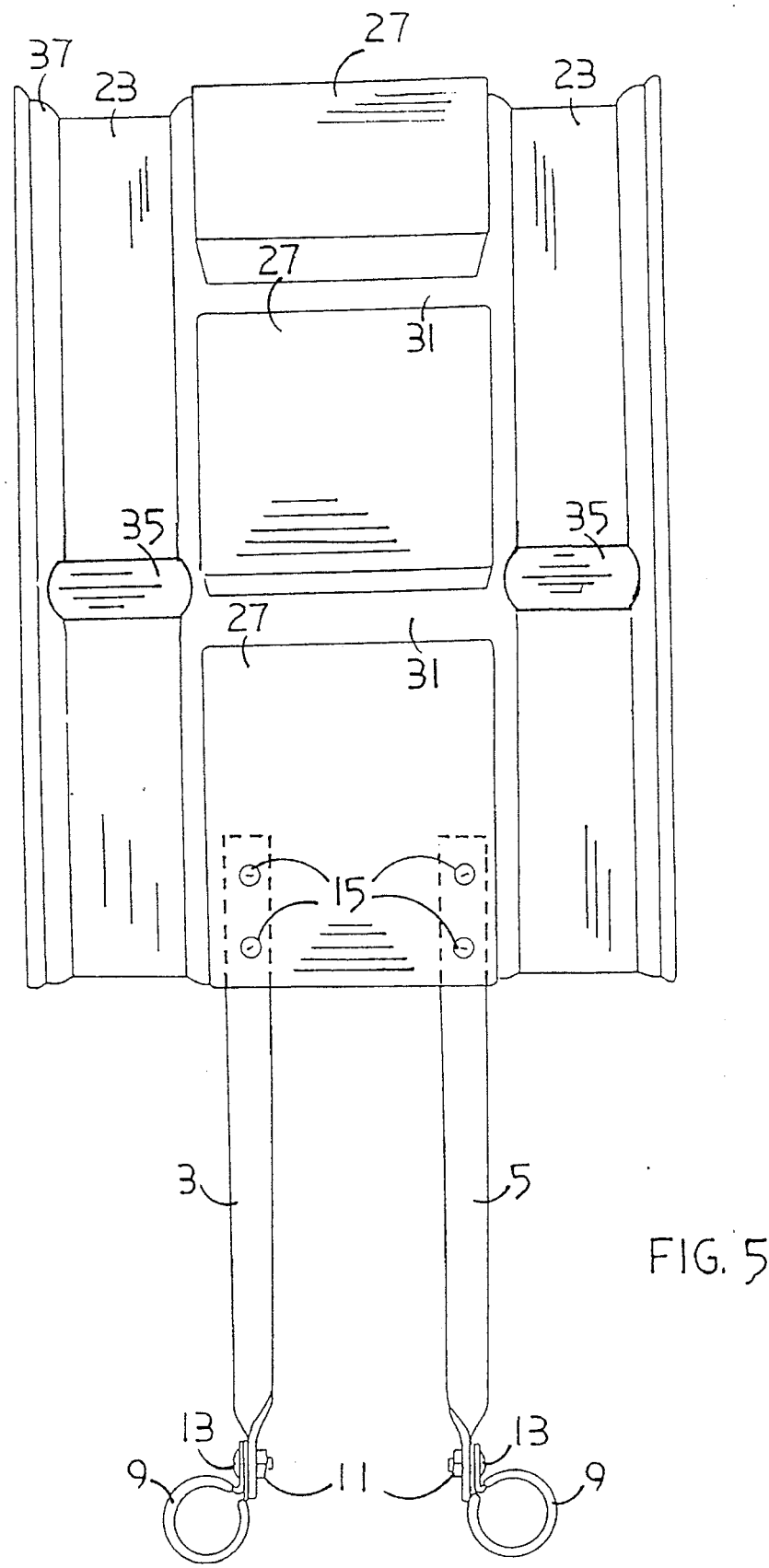
FIG. 5 is a top view of the embodiment of the invention illustrated in FIG. 1.
Figure 6:
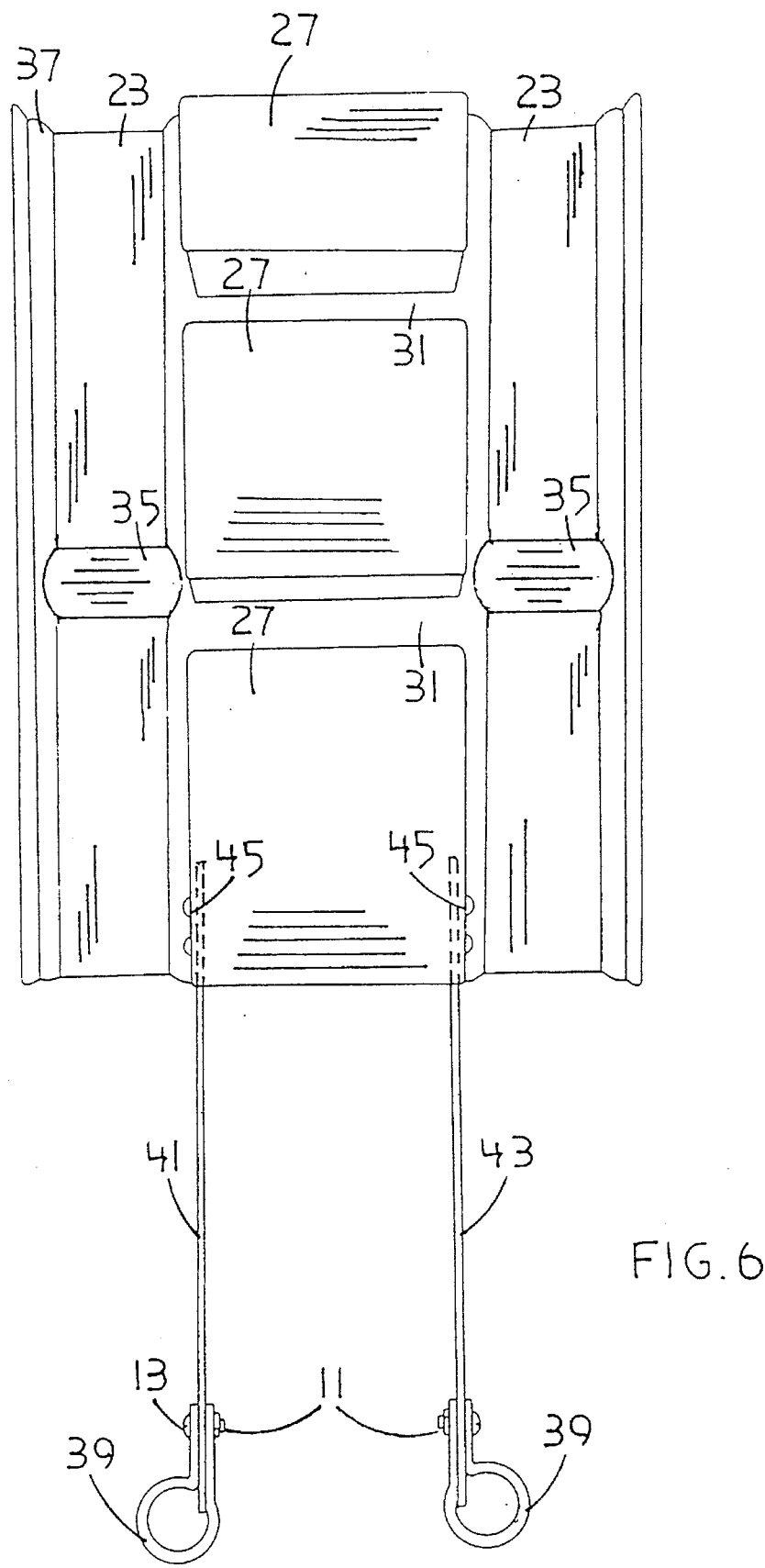
FIG. 6 is a top view of the embodiment of the invention illustrated in FIG. 2.
Figure 7:
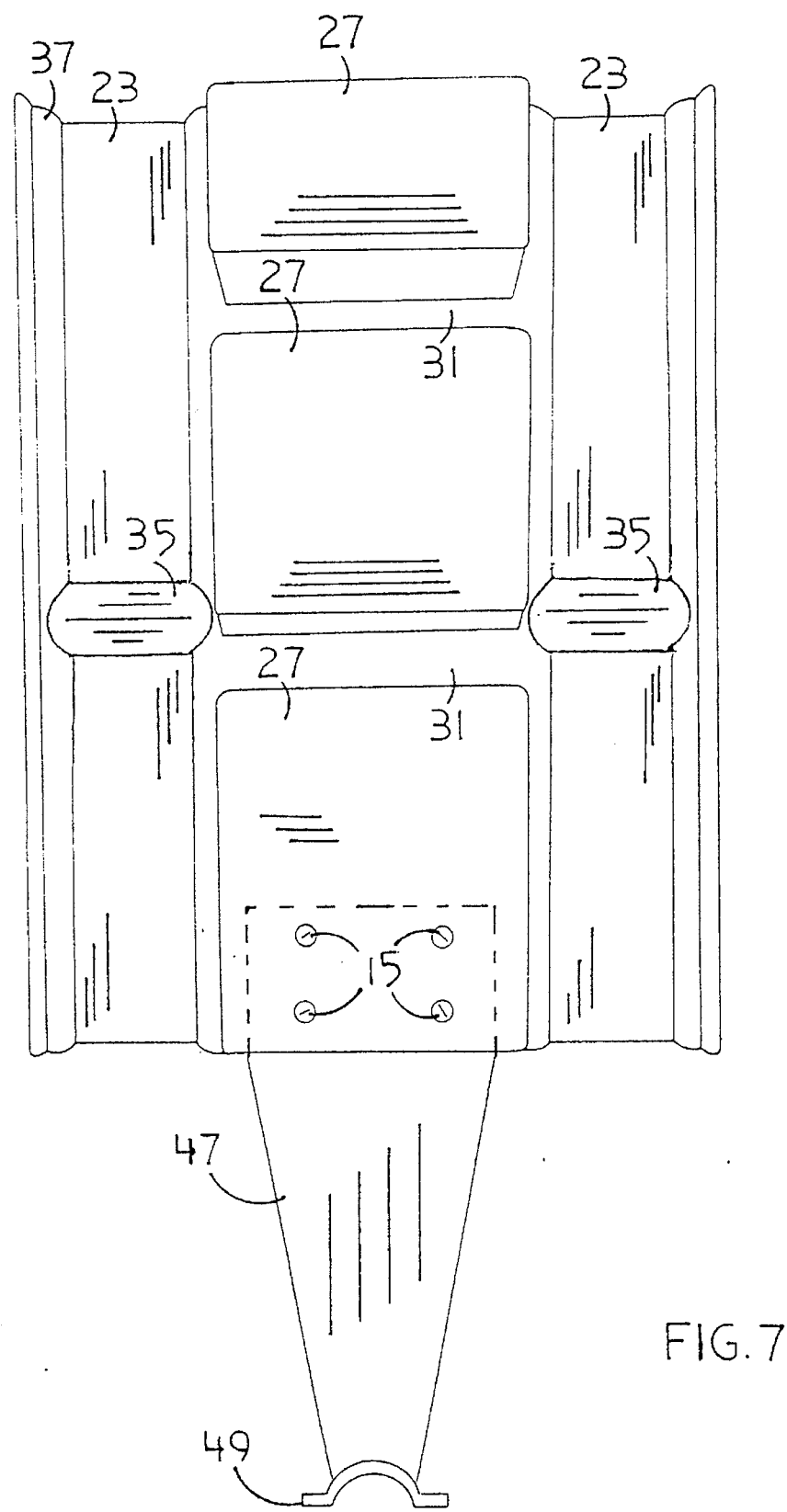
FIG. 7 is a top view of the embodiment of the invention illustrated in FIG. 3.
Figure 8:
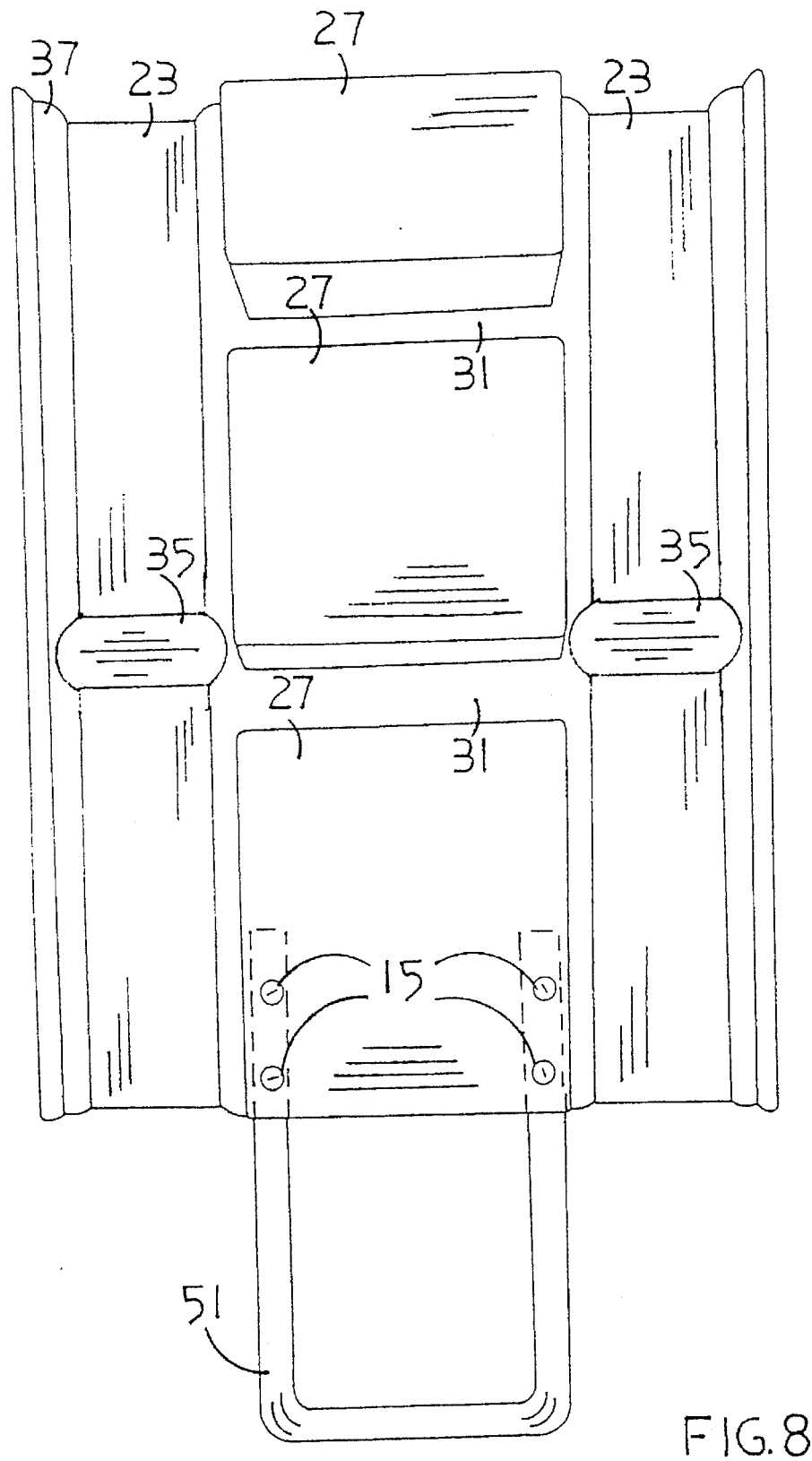
FIG. 8 is a top view of the embodiment of the invention illustrated in FIG. 4
Figure 9:
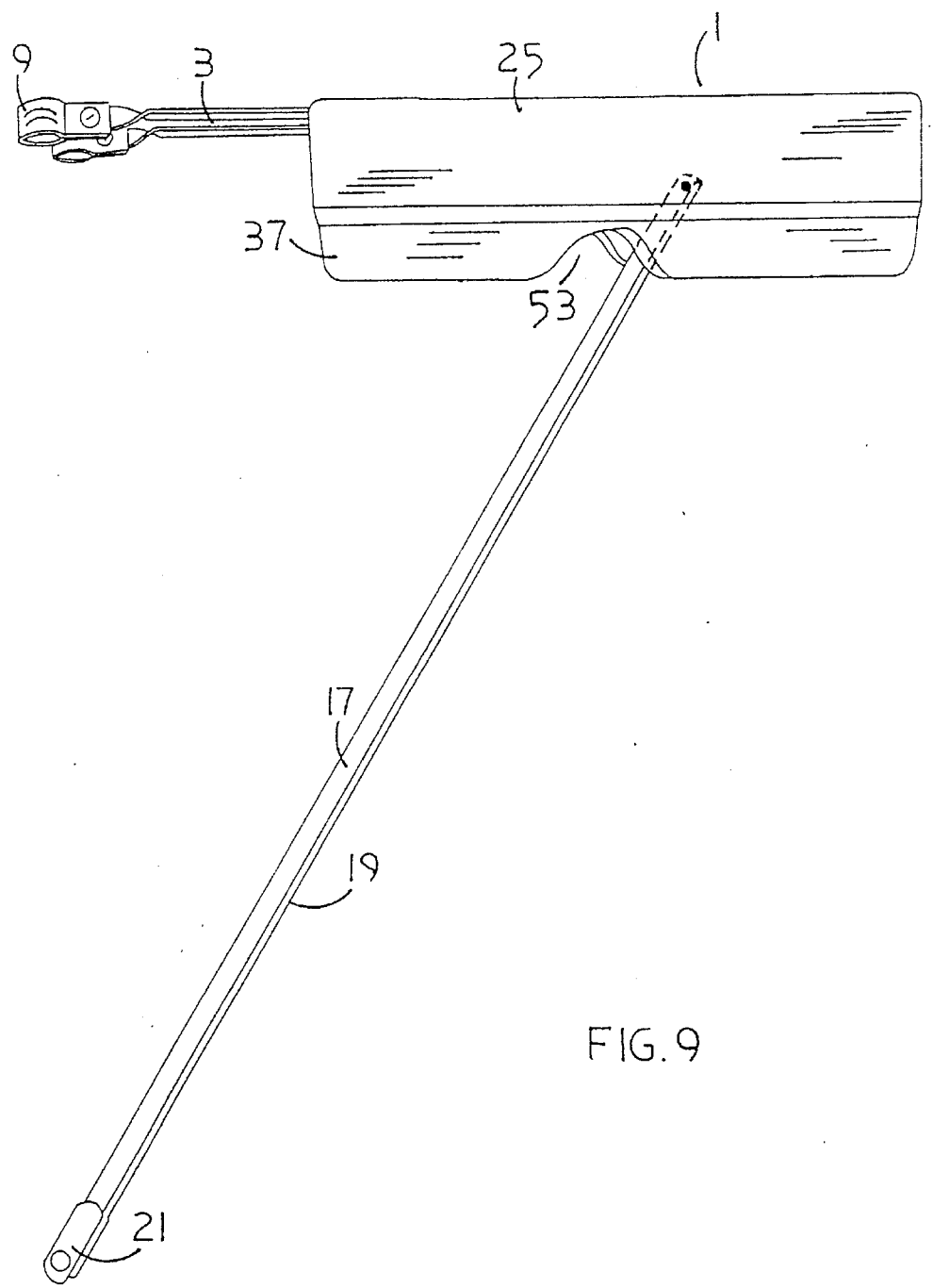
FIG. 9 is a side elevational view of the embodiment of the invention illustrated in FIGS. 1 and 5.
Figure 10:
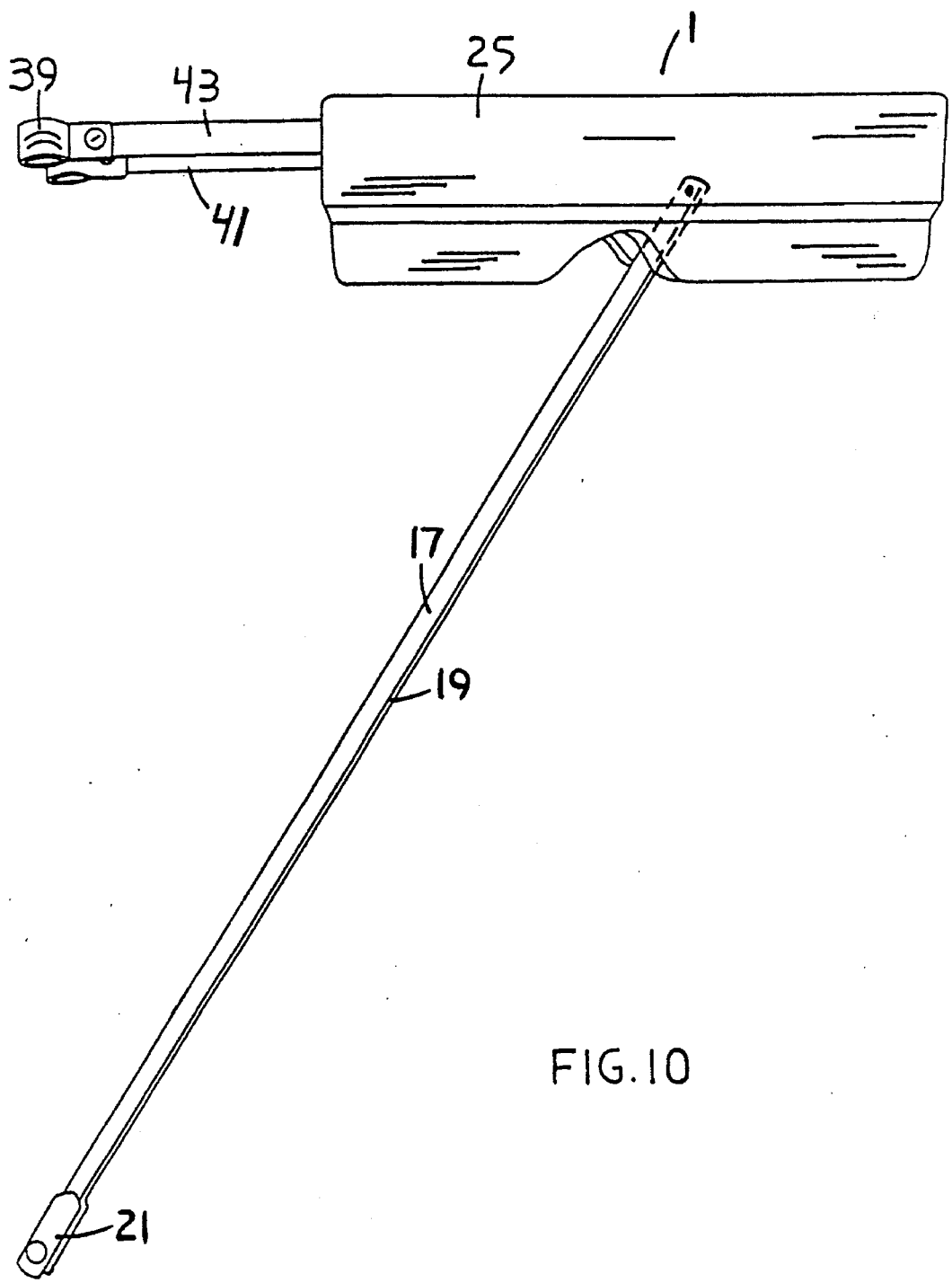
FIG. 10 is a side elevational view of the embodiment of the invention illustrated in FIGS. 2 and 6.

In the next preferred embodiment of the invention, the module 1 is not mounted onto a bicycle rear carrier. Instead, the module 1 takes the place of a bicycle rear carrier horizontal support rack, being attached to the bicycle at the rear forks of the bicycle frame and being attached at the rear axle or at the rear axle flange provided for mounting rearward accessories that is typically found on most bicycles. At the forward end of module 1, there is shown a pair of horizontal support bars 3 and 5, which are both fixably mounted to the under surface of carrier attachment surface 27 by fastening means 15. The fastening means 15 are any conventional types known to the art, including nut-and-bolt combinations, rivets, sheet metal screws and the like. The horizontal support bars 3 and 5 shown in FIG. 1 are of flattened metal construction, and feature a ninety degree twist 7 that enables the bars to become oriented vertically instead of horizontally and therefore accept attachment to bicycle frame clamps 9, attached by attachment means 11 and 13. Attachment means 11 and 13 are here shown as a nut and bolt combination. Bicycle frame clamps 9 are needed in this embodiment to install the carrier of the invention to file rear forks of a bicycle frame (not shown). When clamps 9 are fastened to the rear forks of a bicycle frame, the carrier of the invention is stabilized against back and forth longitudinal movement. Other means are contemplated for mounting onto the bicycle rear fork. FIG. 2 shows an alternative clamp type 39 for mounting onto a bicycle frame rear fork. FIG. 3 shows a tongue bracket 47 and tongue bracket mount 49 that provide alternative means of mounting. FIG. 4 illustrates the use of a U-shaped bracket for mounting onto a bicycle frame In FIGS. 1, 9, 10 and 11 at 17 and 19 there are shown left and right support struts. The struts provide stabilization against up and down movement and lateral movement of the module 1 by virtue of the struts being attached at their lower ends to the bicycle's rear axle (not shown), which will extend through the holes provided in the strut hold-down flanges 21. The struts 17 and 19 are attached to the module 1 by fastening means; which can be any suitable means, including, but not limited to, rivets, bolts, screws and the like.

Turning now to FIGS. 13, 14, 15, 16 and 17 and 15, there is shown another alternative embodiment of the invention, whereby a pair of modules, each adapted for carrying one in-line skate, are separately mounted onto the sides of the horizontal frame elements of a bicycle's rear wheel cargo carrier. The carrier is of the type having a horizontal element 61, front struts 63, rear struts 65, and being secured to a bicycle's rear axle by flange 21. Each carrier hemi-module 57 is suspended by suspension brackets 59 from horizontal frame element 61. Carrier hemi-module 57 is of unitary molded or thermoformed construction, having inner and outer side walls 33 and 25, respectively, with inwardly concaved wall elements 37 and a bottom channel or groove 23, and chocks 35, which serves the same functions as on the other embodiments of the invention, namely, to receive and secure the wheels of an in-line skate. Suspension brackets 59 are fastened to inner wall 33 by fastening means 67, which can be rivets, bolts or screws. The brackets 59 are advantageously coated with a relatively soft vinyl plastic or elastomeric composition.

Any of the embodiments of the invention can be stabilized by the inclusion of one or more straps or cords that can be attached to the underside of the carrier at one end and attached to the bicycle's rear fork or into a hole drilled for thin purpose into a flange adjacent the wheel axle. Particularly preferred for this purpose is the use of an elastomeric cord (commonly referred to as a bungee cord) having a hook at each end.

The various embodiments of the invention also contemplate the use of hold-down means. Hold-down means includes belts, straps, cords, and the like, whether relatively flexible or rigid, that function to keep the skate firmly in place in a module holder. The hold down means can be permanently affixed at one or both ends, or removably affixed at one or both ends. For example, a belt arrangement can be permanently affixed onto each wall of a module carrier, and have a deployment or buckle means in the middle that is engaged somewhere over the shell of the skate to hold it down. A bungee cord can be removably affixed at each end by simply inserting hook ends into holes provided for receiving them in each side wall of a module holder, and pulling the cord over the shell of a skate. In this regard, FIG. 1 shows such an elastomeric cord 24 attached to side wall 25 of module 1. A pair of rigid molded plastic jaws can be hingeably affixed to the walls of the module holder, meeting in art interlock position over the shell of a skate to hold it down. Strap means can be held fast by means of hook and loop fastener such as Velcro®.

If so desired by the user, the carriers of the invention can be de-mounted from the user's bicycle and hand carried by means of a strap attached onto the carrier, provided for that purpose. The strap can be attached to any point or points preferred on the carrier, although we particularly prefer the rearmost portion of the carrier. For the embodiment that consists of a pair of carriers, the separate carriers can be clamped together for the purpose of hand carrying. It can be seen that the hand-carried version of the invention is characterized by the unitary molded or thermoformed construction, but has simply been de-mounted from a bicycle for hand carrying.

It is also within file spirit and scope of the invention to provide for an alternate embodiment in which the skate receiving enclosures are mounted adjacent each side of the front wheel, the enclosures being mounted onto a front carrier rack of the type having a substantially horizontal elongated cargo rack. The front wheel embodiment of the skate rack operates on the same principle as the rear wheel rack described above, relying instead on a front carrier rack rather than a rear carrier rack.

An alternate embodiment of the invention is suitable for carrying any kind of sport, dress or working footwear in the saddlebag enclosures. The holder is simply molded along a somewhat different contour, eliminating the need for inwardly concave surfaces to grip the sidelong outline of an in-line skate. By varying the molding of the sidewall contour accordingly, conventional roller skates can be carried, as well as ski boots, hiking boots, ice skates, riding boots, shoes and the like.

While the invention has been described and illustrated with reference to certain preferred embodiments thereof, those skilled in the art will appreciate that various changes, modifications and substitutions can be made therein without departing from the spirit and scope of the invention. The bicycle carriers that are used with certain of the embodiments of the invention can be not only of the type having a horizontal carrying rack, but also vertical or sloped carrying racks. Although it is preferred that in-line skates be carried in an upright position, the modules can be so configured as to carry the skates in a vertical position, (toe pointed upward) a sloped position, a horizontal position or even up-side down, which of course would prevent moisture from getting into the inside of the skate's boot. Likewise, although it is preferred that the skates be carried in a plane parallel to the plane of the bicycle's wheels, they could be carried in a plane perpendicular or at a slope to the plane of the wheels. It is intended, therefore, that the invention be limited only by the scope of the claims which follow and that: such claims be interpreted as broadly as is reasonable.

What is claimed is:

1. A carrier for an in-line roller skate of the type that includes a boot and a plurality of wheel assemblies mounted in spaced single in-line relationship on the sole of said boot, wherein there is a downward-opening gap between adjacent ones of said wheel assemblies, said carrier including:

a) elongate trough means having an open top open opposite ends defining a length therebetween, and a bottom for engaging said skate wheel assemblies, and laterally spaced-apart opposing side walls extending outwardly from said bottom for receiving said wheel assemblies and retaining said assemblies against lateral movement and holding said skate generally upright in said trough means, said opposing side walls being resiliently deformable from each other and adapted to resiliently embrace said wheel assemblies received in said trough means; and b) wheel chock means extending transversely of said length of said trough means and between said opposite ends for engaging one of said gap to hold said skate against relative longitudinal movement in said trough means.

2. A carrier as defined in claim 1 wherein said bottom comprises a generally flat longitudinally extending wall, and said wheel chock means comprises a transverse ridge extending outwardly from said bottom.

3. A carrier as defined in claim 1 including hold-down means for releasably engaging said skate mounted in said trough means, and for resiliently urging said skate inwardly towards said tough bottom.

4. A carrier as defined in claim 3 wherein said hold-down means comprises at least one resilient flexible cord element having opposite ends, at least one of said opposite ends being releasably securable to said trough means.

5. A carrier as defined in claim 1 wherein said trough means and wheel chock means comprise an integrally-molded unit.

\* \* \* \* \*